Figure 1:
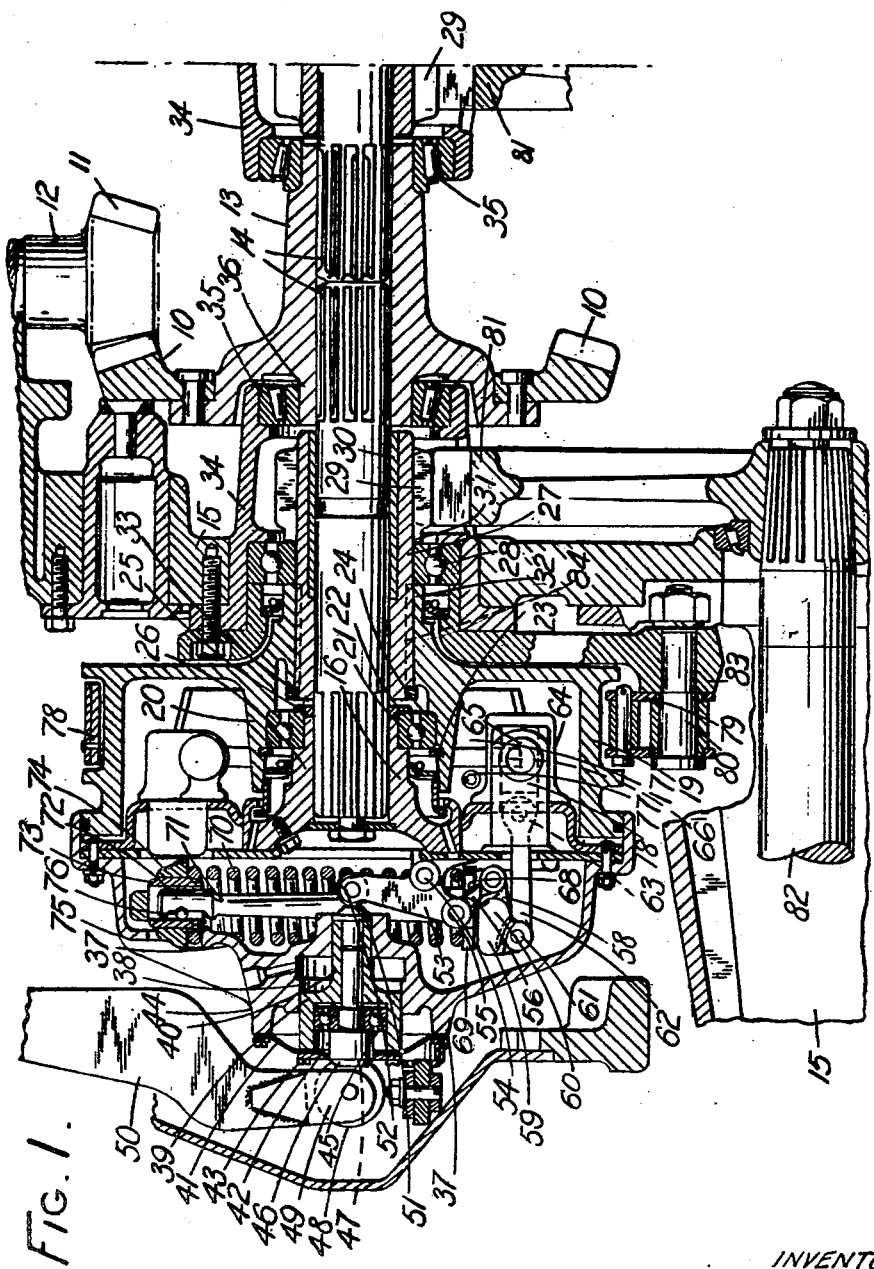

INVENTORS
ERNEST T. J. TAPP &
JOSEPH DAVEY
by Wilkinson Mawhinney
Attorneys

April 1, 1952　　　E. T. J. TAPP ET AL　　　2,591,635
CLUTCH MECHANISM
Filed April 26, 1948　　　　　　　　　　　2 SHEETS—SHEET 2
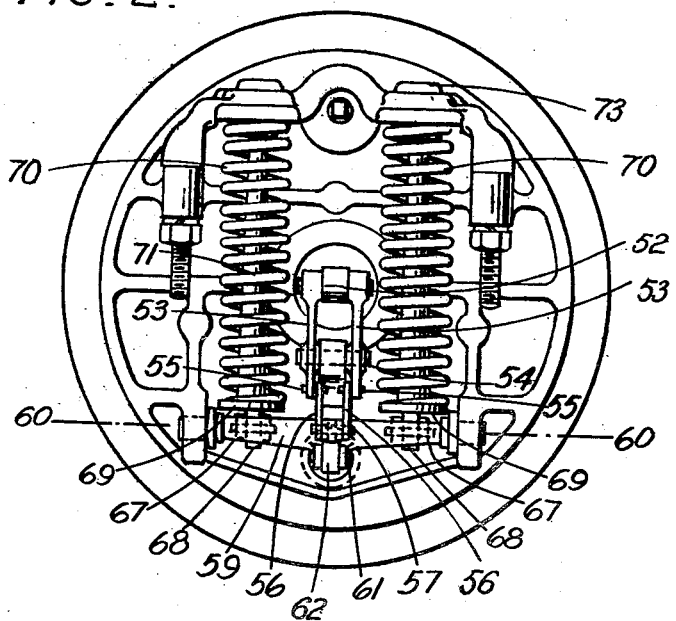
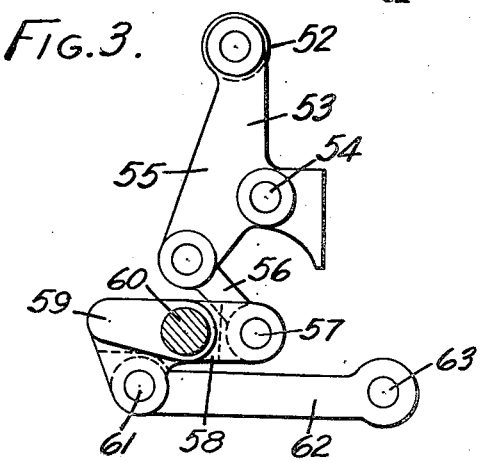
INVENTORS
ERNEST T. J. TAPP &
JOSEPH DAVEY
by Wilkinson Mawhinney
Attorneys Patented Apr. 1, 1952

2,591,635

UNITED STATES PATENT OFFICE 2,591,635

CLUTCH MECHANISM

Ernest Thomas James Tapp and Joseph Davey, Fleet, England, assignors to County Commercial Cars Limited, Aldershot, England, a British company Application April 26, 1948, Serial No. 23,316
In Great Britain April 28, 1947

2 Claims. (Cl. 192—76)

1

According to this invention a clutch mechanism for coupling and uncoupling two co-axial shafts comprises an open ended drum on one shaft, a carrier on the other shaft in the opening of the drum, friction shoes movably mounted on one side of said carrier within the drum together with actuating means for moving said shoes towards and away from the inner surface of the drum, control means mounted on the other side of the carrier and connected through openings in said plate with said actuating means and operating means engaging a part of said control means.

The invention is particularly applicable to steering gears for motor driven vehicles of the kind in which means are provided for coupling the motor to one of two land wheels or tracks and uncoupling it from the other land wheel or track and particularly to an arrangement in which means are provided for applying a brake to whichever of the two wheels or tracks have been uncoupled thereby enhancing the steering effect.

An operating spring may be provided for expanding said shoe and means for contracting said friction shoes against the action of the operating spring. Thus when said contracting means are released the clutch is applied by the operating spring.

The operating spring may be arranged to act upon wedge means arranged between the ends of said shoes, which shoes are drawn together by controlling springs.

The means for controlling the movement of said friction shoes may comprise a push-rod extending out through a part of the carrier and arranged co-axially with the end of said driving shaft and also arranged to operate lever-link mechanism mounted on said carrier so as to move said wedge means against the operating spring in a direction permitting the shoes to be contracted together by their control springs.

The lever-link mechanism may comprise a rock shaft mounted on said carrier and having one arm connected to said wedge means and a second arm pivotally connected to a link which is connected to an end of the lever arm pivotally mounted on said carrier, and having its other end engaged by said push-rod, and one or more abutments offset from the axis of said rock shaft for supporting one end of each of a number of operating compression springs, the other ends of which abut a part of the carrier.

Each abutment for an operating spring may be pivotally mounted on an arm on said rock shaft and is provided with a spindle, a free end of which is guided to move rectilineally along a part of the carrier.

Each of said drums may be encircled by an independently operated friction band.

2

The following is a more detailed description of means for converting the transmission of an existing tractor to a steering mechanism according to this invention, reference being made to the accompanying drawings, in which:

Figure 1 is a horizontal section through a part of the casing housing the transmission, Figure 2 is an elevation of the carrier for the operating springs, and Figure 3 is an enlarged side elevational view of the lever arm 53 and its connections, with parts shown in section.

Most tractors have a differential casing which is normally provided with a crown and pinion gear with which is associated a differential gear, the sun-wheels of which are provided with half-shafts which extend out through bearings in the casing. In converting this gear, the standard crown wheel and differential gear are omitted and in their place there is provided a crown wheel 10 in engagement with a pinion 11 on a propeller shaft 12 which crown wheel has a hub portion 13 internally-splined to receive the splined ends of two half-shafts 14. Each half-shaft extends out through one side 15 of the gear-casing. The outer end of each shaft is splined to receive a carrier plate 16 on which are mounted the friction shoes 17 and wedge operating means 18 of known kind usually employed in wedge operated brake mechanism. The friction shoes are encircled by a brake-drum 19 having within it a hub portion 20 which houses a ball-race 21 disposed between it and the aforesaid carrier 16. The outer race 24 is retained in the housing by a ring 23 which is located in a groove in the wall of the housing while the inner ball-race 22 is retained between a ring 25 in a groove in the half-shaft 14 and a shoulder 26 formed on a hub portion of the carrier plate. The hub portion of the drum is also splined to receive a sleeve 27 which encircles the half-shaft and is carried by a ball bearing 28 in the aforesaid gear-casing. The sleeve extends into the gear-casing and is provided with a pinion 29 at its inner extremity, and is also provided with a lining 30 which forms a bearing for the half-shaft 14. Each pinion 29 engages a gear wheel 81 fixed to a shaft 82 for driving the endless track or wheel of the tractor, which shaft extends out through a bearing secured to the casing. The said ball bearing 28 is located between a shoulder 31 on the sleeve 27 and a shoulder 32 provided by the end of the hub portion 20 of the brake drum. This latter hub portion is retained on the splined sleeve by an internally threaded ring 33 which engages a threaded end of the sleeve. The gear casing 15 has secured to it a housing 34 for taper roller bearings 35, which supports a hub-portion 36 on the crown-wheel 10, and prevents endwise movement thereof.

The friction shoe carrier 16 has secured to it an outer casing part 37 having a cylindrical pocket 38, in which is reciprocally mounted a cup shaped member 39 having a hollow stem portion 40 passing through the bottom of the socket. The cup shaped member has a diaphragm 41 secured by a ring 42 and set-screws 43 to its rim, the outer periphery of which diaphragm is attached to a rim 44 on the casing part 37. The cup shaped member houses a ball bearing 45 which supports a push-rod 46. The outer end of the push-rod is slotted at 47 and the slot is engaged by a roller 48 carried by a fork 49 at the end of a pivoted operating lever 50. The inner end of the push rod is provided with a hard metal head 51 which overlies the end of the hollow stem 40. The head is arranged to engage a roller 52 on one arm 53 of a bell crank lever, which is pivoted at 54 to the aforesaid carrier. Although the head 51 is shown in its outermost position for the sake of clarity the roller 52 is shown in the position it assumes when the push rod 46 has been moved to its innermost position. The other arm 55 of the bell-crank lever is pivotally connected to a link 56 which for convenience is shown detached from the arm 55, and which is pivotally connected at 57 to a forked crank 58 on a rock shaft 59 which is mounted on the carrier to rock about the axis 60. Pivotally connected to another forked crank 61 is a connecting rod 62 which is also pivotally connected at 63 with the wedge means 18. The wedge means are arranged in a housing 64 mounted on the carrier and mounted in the housing on either side of the wedge means in a plug 65. The side of each plug is slotted to receive the projecting end of a strengthening rib 66 of one of the friction shoes 17. The thick end of the wedge means 18 is the right-hand end as viewed in Figure 1. Two other forked cranks 67 are spaced apart on the crank shaft 60, and each has pivotally connected thereto a lug 68 and abutment 69 which carries the lower end of a compression spring 70. The abutment 69 is provided with an upwardly extending stem 71 having an enlargement 72 at its upper end which slides in a bearing 73 in an upper abutment 74 for the compression spring, which abutment is secured in a pocket 75 of the casing part 37. A slot is formed in the side of the enlargement 72 in which is located a ball 76 which rolls along the bearing 73 when the stem 71 is moved by the crank shaft. It will be seen with this arrangement that the compression spring 70 tends to move the wedge means 18 to the left, thereby expanding the friction shoes into engagement with the drum; whereas if the push rod 46 is moved to the right the wedge means are moved in the opposite direction against the action of the operating spring enabling the friction shoes to be drawn together by their controlling springs 77. The drum 19 is encircled by a friction band 78, the ends of which may be moved towards and away from one another by lever mechanism 79 mounted on a pin 80 carried by a bracket 83 fixed to the gear casing.

We claim:

1. A clutch mechanism comprising a tubular shaft, an open ended drum fixed to that shaft, another shaft extending through the tubular shaft and terminating near the open end of the drum, a plate secured to the latter shaft, a pair of friction shoes each pivotally mounted at one end on one side of said plate within the drum, wedge means between the other ends of said shoes, spring means for contacting said brake shoes, a loaded operating spring mounted on the other side of said plate, means acted upon by said operating spring and having a part extending through openings in said plate and engaging said wedge means and operating means comprising a rock shaft mounted on the outside of said plate having one arm connected to a part extending through an opening in said plate and engaging said wedge means and a second arm pivotally connected to a link, a lever arm pivotally mounted on said plate having one end connected to said link, a reciprocal push rod mounted co-axially with said shaft and engaging the other end of the lever arm and a number of abutments on said rock shaft, and a number of springs arranged between said abutments and said plate.

2. A clutch mechanism comprising a tubular shaft, an open ended drum fixed to that shaft another part extending through the tubular shaft and terminating near the open end of the drum, a plate secured to the latter shaft, a pair of friction shoes each pivotally mounted at one end on one side of said plate within the drum, wedge means between the other ends of said shoes, spring means for contracting said brake shoes, a loaded operating spring mounted on the other side of said plate, means acted upon by said operating spring and having a part extending through openings in said plate and engaging said wedge means and operating means comprising a rock shaft mounted on the outside of said plate having one arm connected to a part extending through an opening in said plate and engaging said wedge means and a second arm pivotally connected to a link, a lever arm pivotally mounted on said plate having one end connected to said link, a reciprocal push rod mounted co-axially with said shaft and engaging the other end of the lever arm and a pair of abutments pivotally mounted on said rock shaft and a spindle secured at one end to each abutment and rectilineally guided at the other end on said plate, which operating spring encircles said spindle and at one end engages the abutment and at the other end engages a part of said plate.

ERNEST THOMAS JAMES TAPP.
JOSEPH DAVEY.

REFERENCES CITED

The following references are of record in the file of this patent:

UNITED STATES PATENTS

| Number | Name | Date |
| --- | --- | --- |
| 696,284 | Vivinus | Mar. 25, 1902 |
| 850,987 | Whitehill | Apr. 23, 1907 |
| 880,117 | Ball et al. | Feb. 25, 1908 |
| 988,987 | Evers | Apr. 11, 1911 |
| 994,379 | Faile | June 6, 1911 |
| 1,474,365 | Hupp | Nov. 20, 1923 |
| 1,474,742 | Turnbull | Nov. 20, 1923 |
| 1,520,432 | Norelius | Dec. 23, 1924 |
| 2,077,292 | Waseige | Apr. 13, 1937 |
| 2,374,360 | Lawson | Apr. 24, 1945 |

FOREIGN PATENTS

| Number | Country | Date |
| --- | --- | --- |
| 356,549 | Great Britain | Sept. 10, 1931 |